Aug. 27, 1929.                T. G. HERING                  1,725,981
                        LINEAR MEASURING INSTRUMENT
                            Filed May 12, 1926
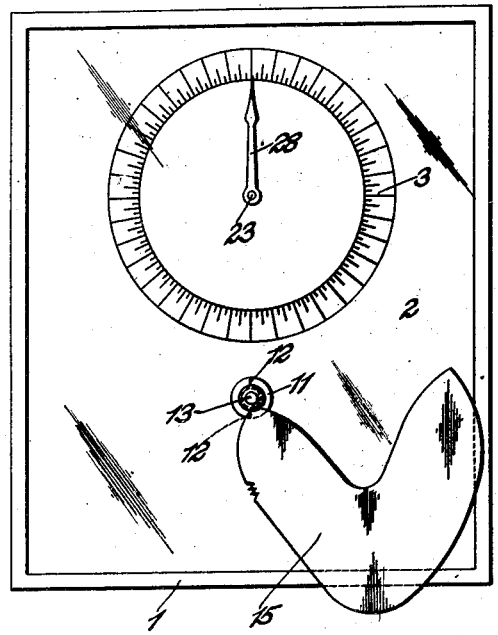
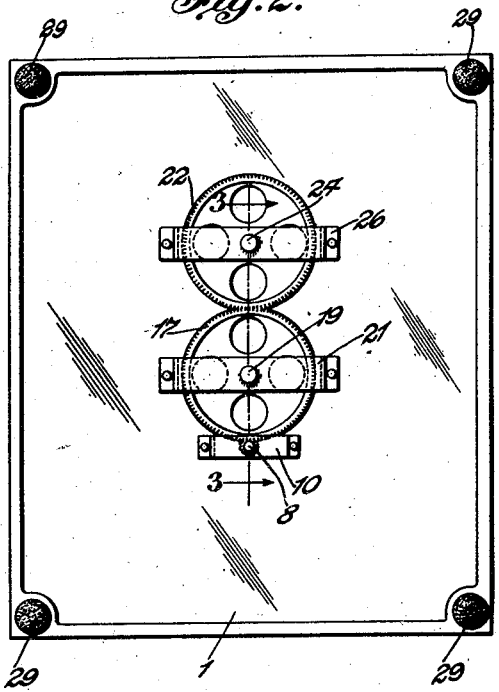
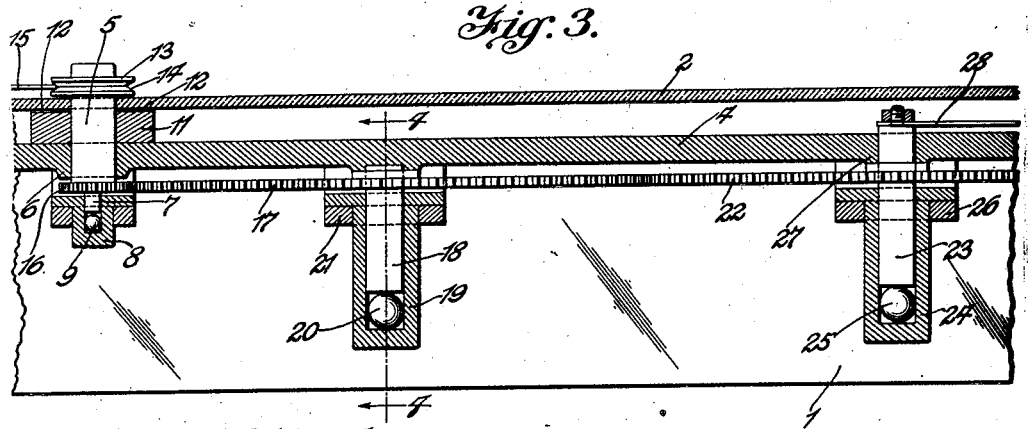
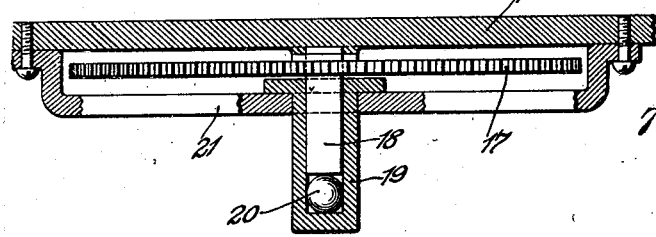
Inventor:
Theodore George Hering
by Rippey & Kingsland
His Attorneys Patented Aug. 27, 1929.

1,725,981

UNITED STATES PATENT OFFICE.

THEODORE GEORGE HERING, OF ST. LOUIS, MISSOURI, ASSIGNOR TO INTERNATIONAL SHOE COMPANY, OF ST. LOUIS, MISSOURI, A CORPORATION OF DELAWARE.

LINEAR-MEASURING INSTRUMENT.

Application filed May 12, 1926. Serial No. 108,468.

This invention relates to improvements in linear measuring instruments and consists in the novel construction hereinafter disclosed.

An object of the invention is to provide an instrument whereby the linear length of the perimeter of an irregularly shaped object, such, for instance, as a pattern for shoe vamps or uppers, may be accurately measured.

Another object of the invention is to provide a device comprising an actuator adapted to be rotated by pressing the marginal edge of an irregularly shaped pattern against a receiving channel formed therein, manually moving the pattern to measure the length of the perimeter thereof, and translating the linear measurement of the perimeter of the pattern to a visible indicator, whereby the linear measurement of the object may be definitely determined.

Additional advantages of the construction will be apparent from the following detailed description thereof, taken in connection with the accompanying drawing, in which Fig. 1 is a plan view of the instrument.

Fig. 2 is a bottom plan view.

Fig. 3 is a vertical section on the line 3—3 of Fig. 2.

Fig. 4 is a vertical section on the line 4—4 of Fig. 3.

In the embodiment of the invention illustrated in the drawing, the device is shown as comprising a rectangular case 1 having a glass panel 2, the upper plane of which is flush with the upper marginal edge of the side walls of the case, said panel 2 constituting a work support, and upon which is formed a circular indicating dial 3 divided into any suitable units of measurement, or a separate dial may be attached to the underface of the panel through which it is visible.

Beneath the panel 2 and arranged parallel therewith is a supporting plate 4 which may be formed integral with the side walls of the housing or made separately and attached thereto. A short shaft 5 extends through an opening in the panel 2 and through an opening in a boss 6 formed on the underface of the plate 4, said shaft having a reduced cylindrical extension 7 at its lower end that fits into a bearing member 8. The bearing member 8 has a central cylindrical recess therein, the bottom of which constitutes a seat for a ball bearing 9 upon which the lower face of the cylindrical extension 7 is supported. The bearing member 8 is supported in a U-shaped bracket 10 attached to the underface of the plate 4.

The construction just described provides a non-friction bearing for the shaft 5 so that the same may be easily rotated.

Between the panel 2 and the upper face of the plate 4 there is a block 11 having an opening therein through which the shaft 5 extends. The block 11 is affixed to the upper face of the plate 4 and has diametrically arranged radial indicating lines 12 thereon for centering the pattern to be measured, as will be described more particularly hereinafter.

The portion of the shaft 5 that extends above the top of the panel 2 carries a roller 13 in the periphery of which is formed a V-shaped groove 14. The shaft 5 is rotated by pressing the marginal edge of the pattern 15 frictionally against the base of the groove 14 and the pattern is manually moved throughout the length of its perimeter, the linear movement of the pattern being translated into a rotary motion of the shaft 5.

In order to accurately determine the starting and completion point of the perimeter of the pattern, if the pattern is one that includes any pointed or angular formation, the apex of the angle is alined with the indicating mark on one side of the member 11, thereby placing said apex in a radial plane passing through the indicating mark on the opposite side. When the pattern has been moved around the marginal edge and the starting point reached, the apex of the angular portion is again alined, indicating the exact point of beginning of the measurement operation. If there is no natural formation of the pattern that can be readily alined with the indicating marks 12, a line may be drawn on the edge of the pattern, which will serve the same purpose as the angular formation by placing the line in a plane passing through the opposed radial lines 12.

The shaft 5 carries near its lower end a pinion 16 which meshes with a gear 17. The gear 17 is integrally connected with a shaft 18, said shaft 18 being supported in a bearing member 19, said bearing member 19 having a central cylindrical recess, the bottom of which forms a seat for a ball bearing 20 upon which the lower face of the shaft 18 rests.

The bearing member 19 is supported from the bottom face of the plate 4 by a U-shaped bracket 21 attached to said plate. The gear 17 meshes with the indicator gear 22, said gear 22 being integrally connected with a shaft 23, said shaft 23 being supported in a bearing member 24, said bearing member having a central cylindrical recess, the bottom of which constitutes a seat for a ball bearing 25 and against which the lower face of the shaft 23 rests.

The bearing member 24 is supported from the bottom face of the plate 4 by a U-shaped bracket 26 attached to the plate 4. The shaft 23 extends through an opening in a boss 27 formed on the underface of the plate 4 and an indicator in the form of a pointer 28 is connected with the upper end of the shaft 23.

The gears 17 and 22 have the same number of teeth and the gear ratio of the pinion 16 with the gear 17 is equated with the ratio between the circumference of the base of the groove 14 of the friction roller and the circumference of the measuring dial over which the indicator or pointer 28 travels.

From the foregoing description, it will be understood that the linear measurement of the perimeter of the irregular pattern may be translated into any unit of measure and that by including the idler gear 17, the direction of rotation of the pointer will be the same as the direction of rotation of the friction roller which is preferably in a clockwise direction.

It is contemplated that the device shall be made of a size so that it is readily portable. It is also preferred that the case be provided with frictionally resilient feet 29 so that it may be conveniently mounted on a permanent support.

I am aware that the invention may be modified without departing from the spirit and scope thereof, but what I claim and desire to secure by Letters Patent is:—

1. An instrument of the class described comprising a housing, a transparent panel forming the upper wall of the housing, an indicating dial visible through said panel, an indicator cooperating with said dial, a shaft for said indicator, a roller extending above the upper face of said panel, a shaft for said roller, and gearing between said last named shaft and said indicator shaft.

2. An instrument of the class described comprising a housing, a transparent panel forming the upper wall of the housing, an indicating dial visible through said panel, an indicator cooperating with said dial, a shaft for said indicator, a roller extending above the upper face of said panel, a shaft for said roller, and gearing between said last named shaft and said actuator shaft including a pinion on said roller shaft, an intermediate gear meshing therewith and a gear on the actuator shaft meshing with said intermediate gear.

3. An instrument of the class described comprising a housing, a transparent panel forming the upper wall of the housing, an indicating dial visible through said panel, an indicator cooperating with said dial, a shaft for said indicator, a roller extending above the upper face of said panel, a shaft for said roller, gearing between said last named shaft and said actuator shaft including a pinion on said roller shaft, an intermediate gear meshing therewith and a gear on the actuator shaft meshing with said intermediate gear, and non-frictional bearings for said shafts.

4. A linear measuring instrument comprising a support, a circular indicating dial on said support, a rotary shaft having its axis in alinement with the axis of said dial, an indicator attached to said shaft for cooperation with said dial, a rotary shaft extending downwardly through said work support, a roller attached to said second shaft above said work support for engagement with and operation by the work, and gearing operated by said second shaft for operating said first shaft and thereby said indicator.

5. A linear measuring instrument comprising a flat support, a circular indicating dial on said support, a shaft in axial alinement with the axis of said dial, an indicator on said shaft below said support and operated by said shaft to cooperate with said dial, a rotary shaft extending downwardly through said support, a roller attached to said second shaft above said support for engagement with and rotation by the work to be measured, and mechanism below said work support and operated by said second shaft for operating said first shaft and thereby said indicator.

6. A linear measuring instrument comprising a transparent work support, a circular stationary indicating dial arranged for observation through said support, a rotary shaft coaxial with the plane of the axis of said dial, an indicator attached to and visibly operated by said shaft below said work support for cooperation with said dial, both said dial and said indicator being visible through said work support, and mechanism operated by the work on said support for operating said shaft and thereby visibly operating said indicator while the work is visibly operated in connection with said mechanism.

7. A linear measuring instrument comprising a transparent work support, a circular visible stationary indicating dial, a rotary shaft coaxial with the plane of the axis of said dial, an indicator attached to and operated by said shaft below said work support for cooperation with said dial, a shaft extending downwardly through said support, means for rotating said second shaft by the work on said support, and mechanism below said support and operated by said second shaft for rotating said first shaft.

8. An instrument of the character described comprising a support, a transparent panel, means for supporting said panel spaced above said support, an indicating dial visible through said panel, an indicator between said panel and said support for cooperation with said dial, a shaft projecting through said support and having its upper end connected with said indicator, a roller above said panel, a shaft extending through said support and said panel and having its upper end attached to said roller, and gearing for operating said first named shaft by said second shaft.

9. An instrument of the character described comprising a supporting element, a transparent panel element supported in spaced relationship above said supporting element, an indicating dial visible through said panel element, an indicator between said elements, a shaft projecting upwardly through said supporting element and having its upper end attached to said indicator, a second shaft projecting upwardly through both said supporting element and said panel element, a roller attached to said second shaft above said panel element, a pinion on the lower end of said second shaft, a gear attached to said first shaft, and means for operating said gear by said pinion.

THEODORE GEORGE HERING.